US011047342B2

(12) United States Patent
Williams et al.

(10) Patent No.: US 11,047,342 B2
(45) Date of Patent: Jun. 29, 2021

(54) VAPOR PURGE SYSTEM HAVING VENTURI HOSE-OFF DETECTION CAPABILITY

(71) Applicant: Continental Powertrain USA, LLC, Auburn Hills, MI (US)

(72) Inventors: Benjamin Dominick Manton Williams, Chatham (CA); Jaime Altes Sosa, Chatham (CA); David Rene Forgeron, Tilbury (CA); Ravinder Singh Gill, Kitchener (CA)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 16/374,104

(22) Filed: Apr. 3, 2019

(65) Prior Publication Data
US 2019/0309708 A1    Oct. 10, 2019

Related U.S. Application Data

(60) Provisional application No. 62/654,003, filed on Apr. 6, 2018.

(51) Int. Cl.
F02M 25/08    (2006.01)
F02M 35/10    (2006.01)
(Continued)

(52) U.S. Cl.
CPC ......... F02M 25/0809 (2013.01); F02B 37/12 (2013.01); F02D 41/003 (2013.01);
(Continued)

(58) Field of Classification Search
CPC .... F02B 37/00; F02B 37/12; F02D 2041/225; F02D 2200/0406; F02D 41/0007;
(Continued)

(56) References Cited

U.S. PATENT DOCUMENTS 6,301,955 B1 * 10/2001 Cook ................. F02M 25/0818
                                                     73/114.39
6,343,505 B1 *  2/2002 Cook ................. F02M 25/0809
                                                     73/114.39
(Continued)

FOREIGN PATENT DOCUMENTS

CN       102588154 A       7/2012
DE    102016210570 A1     12/2017
WO     2015/089176 A1      6/2015

OTHER PUBLICATIONS

International Search Report and Written Opinion dated Jun. 17, 2019 from corresponding International Patent Application No. PCT/US2019/025811.

Primary Examiner — Jesse S Bogue

(57) ABSTRACT

An vapor purge system for a turbocharged internal combustion engine having an evaporative emissions turbo purge valve incorporating a venturi vacuum generator and a hose-off detection function. The turbo purge valve includes a pressure sensor, and a low restriction check valve which is integrated into the outlet port of the venturi vacuum generator. The pressure sensor is capable of detecting the small pressure drop (i.e., vacuum) generated at the air inlet tube or air box during naturally aspirated conditions. The check valve closes the venturi vacuum generator on the purge side during naturally aspirated conditions, allowing fluid communication to the air intake system through one port only, and the detection of the vacuum during these conditions. If a hose becomes detached, either at the outlet port of the venturi vacuum generator or at the air box, the small vacuum is not detected, and the ECU then diagnoses the hose-off condition.

14 Claims, 4 Drawing Sheets

(51) Int. Cl.
*F02D 41/00* (2006.01)
*F02B 37/12* (2006.01)

(52) U.S. Cl.
CPC ....... *F02D 41/0007* (2013.01); *F02M 25/089* (2013.01); *F02M 25/0836* (2013.01); *F02M 35/1038* (2013.01); *F02M 35/10222* (2013.01); *F02M 35/10229* (2013.01); *F02D 2200/0406* (2013.01)

(58) Field of Classification Search
CPC .............. F02D 41/003; F02D 41/0032; F02M 25/0809; F02M 25/0836; F02M 25/089; F02M 35/10222; F02M 35/10229; F02M 35/1038
See application file for complete search history.

(56) References Cited

U.S. PATENT DOCUMENTS

| | | | | |
|---|---|---|---|---|
| 7,367,326 B2* | 5/2008 | Shikama | ............ | F02M 25/0809 123/198 D |
| 8,843,265 B2* | 9/2014 | Sager | ................ | F02M 25/0836 701/33.6 |
| 8,924,133 B2* | 12/2014 | Hadre | ................ | F02M 25/0836 701/107 |
| 9,032,710 B2* | 5/2015 | White | ....................... | F01N 3/36 60/286 |
| 9,109,552 B2* | 8/2015 | Williams | ............... | F02M 25/08 |
| 9,528,473 B2* | 12/2016 | Dudar | ................ | F02D 41/1456 |
| 9,551,304 B2 | 1/2017 | Haefele | | |
| 10,151,274 B2* | 12/2018 | Maegawa | .......... | F02D 41/0045 |
| 10,519,889 B2* | 12/2019 | Kurosawa | .......... | F02M 25/0809 |
| 10,655,568 B2* | 5/2020 | Choi | ................... | F02D 41/0047 |
| 2005/0029480 A1* | 2/2005 | Cook | ................... | F16K 31/082 251/129.19 |
| 2011/0203257 A1* | 8/2011 | White | .................. | F01N 3/0253 60/274 |
| 2013/0014730 A1* | 1/2013 | Shimura | .............. | F02M 25/089 123/520 |
| 2014/0251284 A1 | 9/2014 | Plymale et al. | | |
| 2014/0331976 A1* | 11/2014 | Tsumoto | ............ | F02M 25/0836 123/519 |
| 2016/0186700 A1* | 6/2016 | Nishiura | ............ | F02M 25/0854 123/519 |
| 2018/0058385 A1* | 3/2018 | Choi | ................... | F02M 25/089 |
| 2018/0372028 A1* | 12/2018 | Nakata | .............. | F02M 25/0836 |

\* cited by examiner

VAPOR PURGE SYSTEM HAVING VENTURI HOSE-OFF DETECTION CAPABILITY

CROSS-REFERENCE TO RELATED APPLICATIONS

This application claims the benefit of provisional application 62/654,003, filed Apr. 6, 2018. The disclosure of the above application is incorporated herein by reference.

FIELD OF THE INVENTION

The invention relates generally to a turbocharger air flow system having a turbo purge module, which has the ability to detect a detached hose, or "hose-off condition," reliably and effectively.

BACKGROUND OF THE INVENTION

Current purge systems for engines having a turbocharger unit use a venturi vacuum generator (i.e., a vacuum pump) to allow purge of the evaporative system while the turbocharger unit is activated (i.e., manifold under positive pressure). This has traditionally been accomplished with discreet components added down-stream of a purge valve. The purge valve itself may contain check valves to direct the purge flow appropriately.

A challenge for preventing the release of purge vapor into the atmosphere is the detection of a disconnected hose between the outlet of the venturi vacuum generator and the manifold air intake tube or air box. If this hose becomes detached, the venturi vacuum generator pulls vapor out of the canister and releases the emissions into the environment. Using discrete sensing components connected by plumbing only provides for detection of a hose-off condition between the sensor and the air box.

Accordingly, there exists a need for a vapor purge system, which is able to detect a hose-off condition between the venturi outlet and the air inlet (airbox) reliably and effectively.

SUMMARY OF THE INVENTION

In one embodiment, the present invention is an arrangement of an air flow system for a turbocharged internal combustion engine having an evaporative emissions turbo purge valve incorporating a venturi vacuum generator and a hose-off detection function for detecting when a hose or conduit has become detached from either the turbo purge valve or the air inlet tube (or air box).

In one embodiment, the turbo purge valve includes a pressure sensor, and a low restriction check valve which is integrated into the outlet port of the venturi vacuum generator. The pressure sensor is capable of detecting the small pressure drop (i.e., vacuum) generated at the air inlet tube or air box during naturally aspirated conditions on a turbocharged internal combustion engine. The check valve closes the venturi vacuum generator outlet during naturally aspirated conditions, allowing fluid communication to the air intake manifold through one port only, and the detection of the vacuum during these conditions at the second port.

With the hose connected, a small amount of vacuum is detected inside the port of the venturi outlet, past the check valve during specific vehicle conditions (e.g.: engine idle during naturally aspirated conditions).

If the hose becomes detached, either at the outlet port of the venturi vacuum generator or at the air box, the small amount of vacuum is not detected, and the ECU then diagnoses the hose-off condition.

One of the advantages of the present invention is that by integrating the sensor into the turbo purge valve within the body of the venturi vacuum generator, the hose-off condition is more precisely detected. There are no other hose connections that could fail. Even a failure of the pressure sensor connection itself is able to be detected.

In one embodiment, the present invention is a vapor purge system having a hose-off detection function, where the vapor purge system includes a turbocharger unit, an intake manifold in fluid communication with the turbocharger unit, and a turbo purge module in fluid communication with the intake manifold. The turbo purge module includes a housing having a cavity, a first check valve mounted to the housing, a second check valve mounted to the housing, and a venturi device located in the cavity. The first check valve and the second check valve control the flow of air and purge vapor through the venturi device.

A pressure sensing assembly is connected to the turbo purge module, and at least one conduit is connected to and in fluid communication with the inlet of the turbocharger unit and the turbo purge module.

During a first mode of operation, the turbocharger unit is inactive, and there is vacuum pressure in the intake manifold, and the turbo purge module is exposed to the vacuum pressure such that the first check valve is opened and the second check valve is closed, and purge vapor flows through the turbo purge module, around the first check valve and into the intake manifold. During the first mode of operation, there is vacuum pressure upstream of the turbocharger unit, in the air inlet conduit, and a portion of the turbo purge module, and the vacuum pressure in the conduit is detected by the pressure sensing assembly.

During a second mode of operation, the turbocharger unit is active and generates pressurized air such that the intake manifold is operating under positive pressure, the first check valve is closed, and the second check valve is opened. The turbo purge module is deactivated during the second mode of operation if, during the first mode of operation, vacuum pressure in the conduit is undetectable by the pressure sensing assembly as a result of the conduit becoming disconnected from the turbocharger unit or the turbo purge module.

In an embodiment, the turbo purge module includes a first check valve cavity adjacent the housing, and the first check valve is located in the first check valve cavity. The first check valve is operable for biasing the flow of air between the cavity and the first check valve cavity. The turbo purge module also includes a second check valve cavity adjacent the housing, and the second check valve is located in the second check valve cavity. The second check valve is operable for providing selective fluid communication between the cavity and the second check valve cavity.

The pressure sensing assembly detects the vacuum pressure in the second check valve cavity during the first mode of operation when the conduit is connected to and in fluid communication with the turbocharger unit and the turbo purge module. The turbo purge module is deactivated during the second mode of operation if, during the first mode of operation, vacuum pressure in the second check valve cavity is undetectable by the pressure sensing assembly. During the second mode of operation, purge vapor is prevented from being released into the atmosphere when the turbo purge module is inactive as a result of vacuum pressure in the conduit being undetectable by the pressure sensing assembly during the first mode of operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
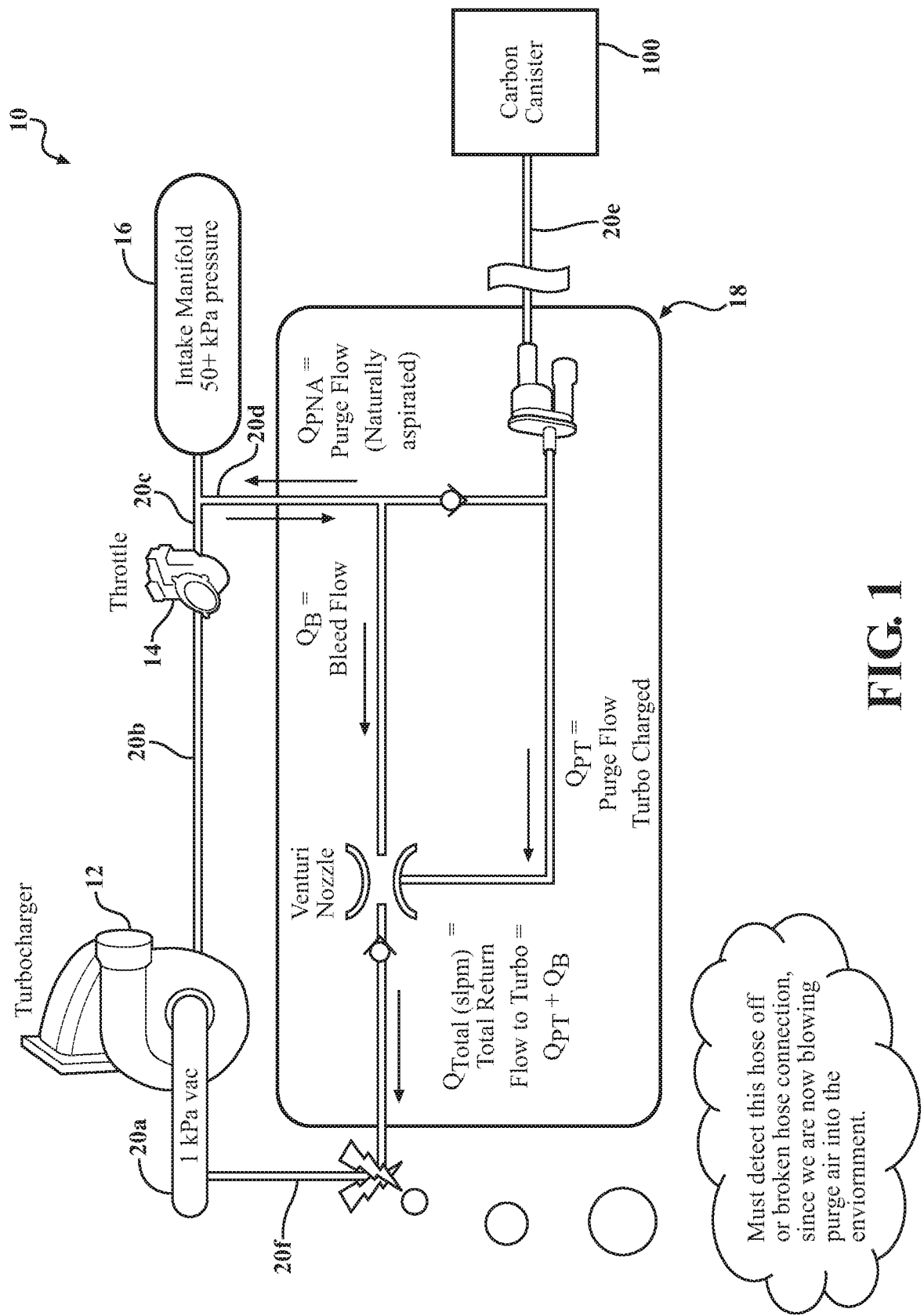
FIG. 1 is a diagram of a vapor purge system having a hose-off detection function, according to embodiments of the present invention.

A diagram of a vapor purge system having a three-port turbo purge module with venturi hose-off detection capability according to the present invention is shown in the FIG. 1 generally at 10. The system 10 includes a plurality of conduits, one of the conduits is an inlet passage 20a which intakes air from the atmosphere. Located downstream of and in fluid communication with the inlet passage 20a is a turbocharger unit 12 and located downstream of and in fluid communication with the turbocharger unit 12 is a throttle assembly 14. The throttle assembly 14 controls the amount of air flow into an intake manifold 16, which is part of an engine. Air flows from the throttle assembly 14 into the intake manifold 16.

As mentioned above, a plurality of conduits also provides fluid communication between the various components. Air flows through the conduits between the various components, and the direction of airflow through the conduits varies, depending on the mode of operation of each component. More specifically, in addition to the inlet passage 20a providing fluid communication from the atmosphere to the turbocharger unit 12, there is a second conduit 20b providing fluid communication between the turbocharger unit 12 and the throttle assembly 14. There is also a third conduit 20c providing fluid communication between the throttle assembly 14 and the intake manifold 16.

Figure 2:
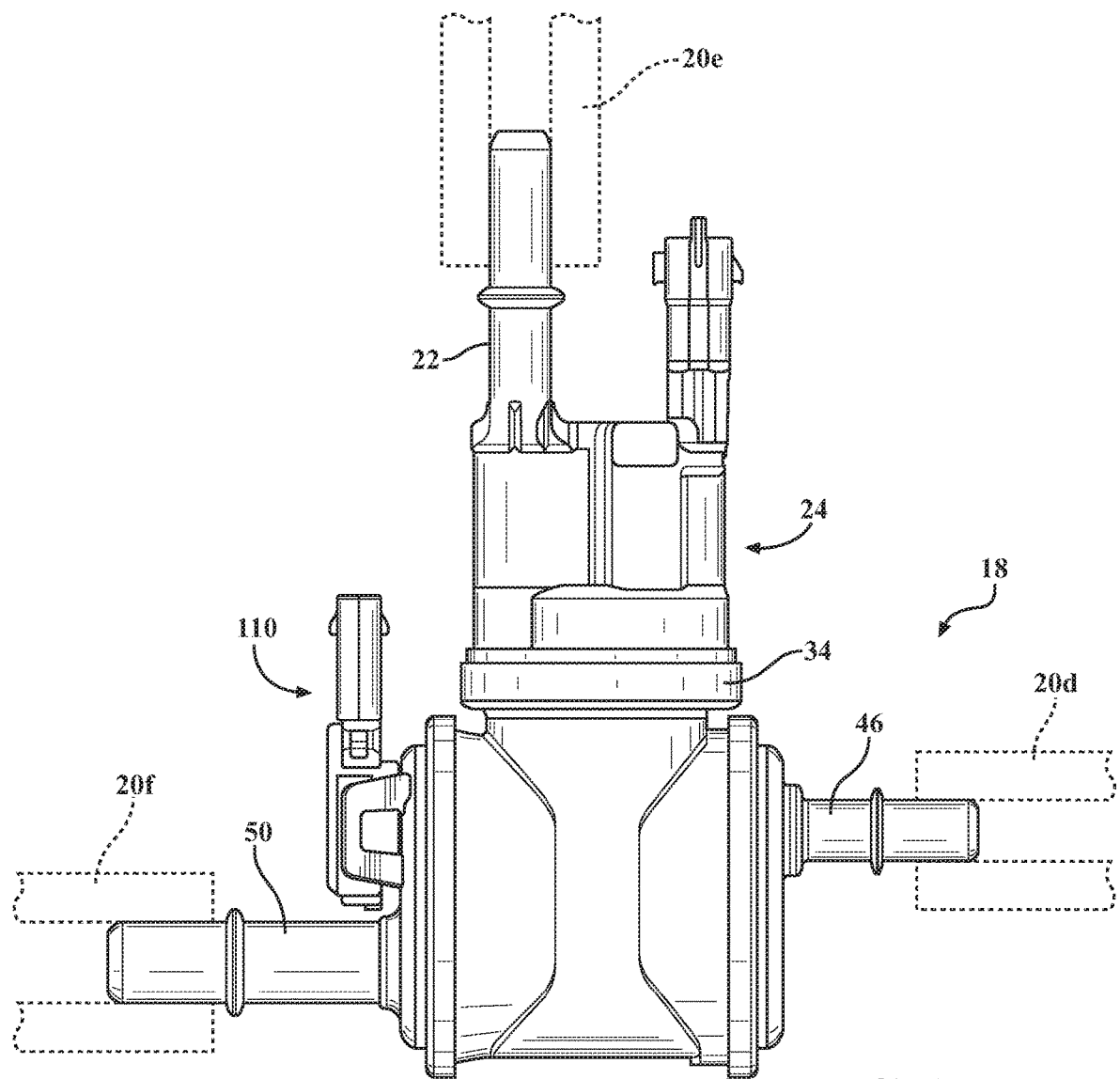
FIG. 2 is a side view of a three-port turbo purge module used as part of a vapor purge system having a hose-off detection function, according to embodiments of the present invention.
Figure 3:
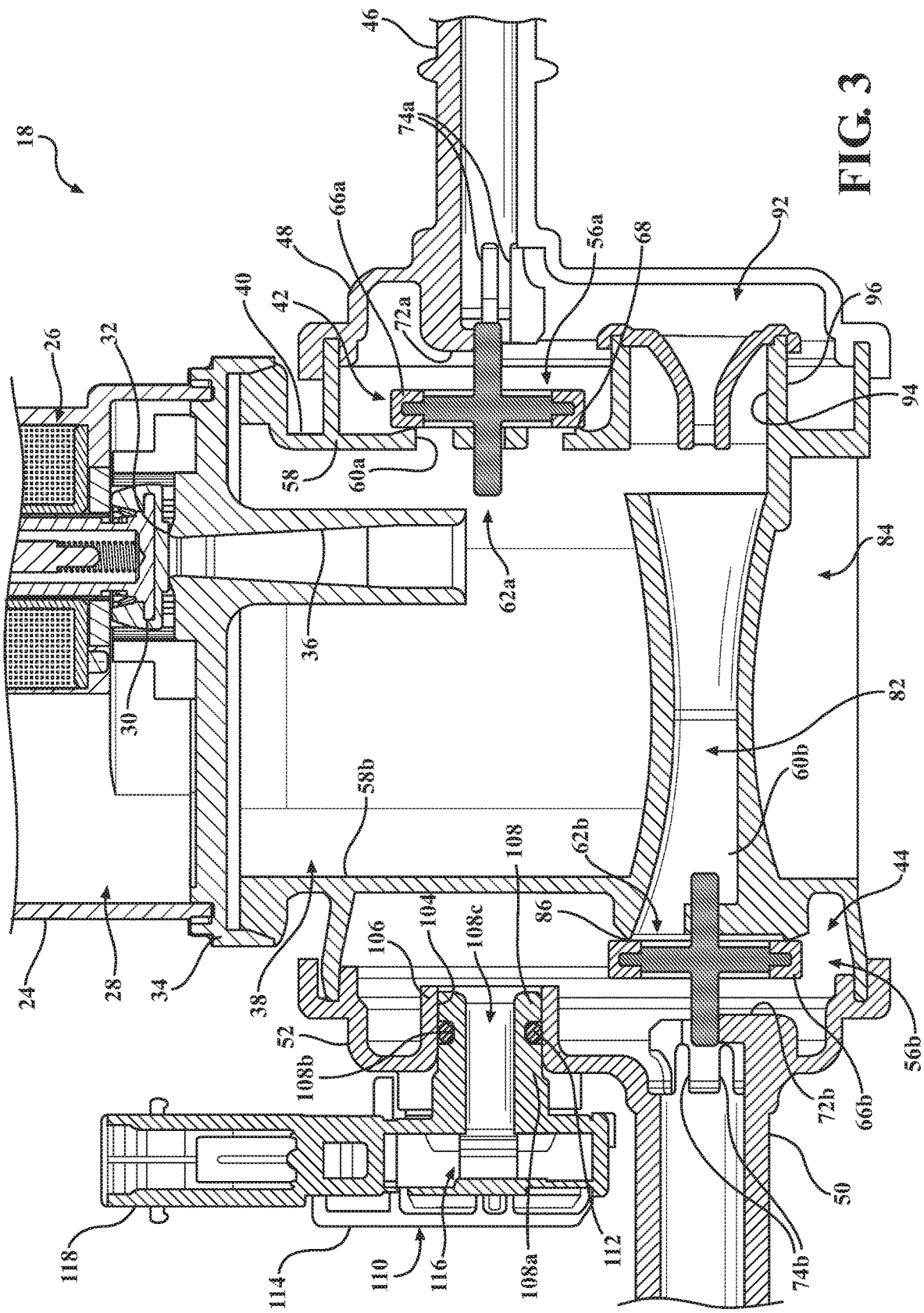
FIG. 3 is a sectional view of various components of a three-port turbo purge module used as part of a vapor purge system having a hose-off detection function, according to embodiments of the present invention.

Referring generally to FIGS. 1-3, a fourth conduit 20d is in fluid communication with the third conduit 20c and a three-port turbo purge module, shown generally at 18. Additionally, a fifth conduit 20e is connected to and in fluid communication with an inlet port 22 which is integrally formed with an overmold assembly housing 24. Disposed within the overmold assembly housing 24 is a solenoid assembly, shown generally at 26, and the solenoid assembly 26 is disposed within a cavity, shown generally at 28, formed as part of the overmold assembly housing 24. The solenoid assembly 26 includes and is able to control the movement of a valve member 30, where the valve member 30 is selectively in contact with a valve seat 32.

Referring to FIG. 3, the valve seat 32 is integrally formed as part of a cap portion 34, where the cap portion 34 is connected to the overmold assembly housing 24. Integrally formed with the valve seat 32 is an outlet port 36, which is also part of the cap portion 34, and extends into a cavity, shown generally at 38, of a housing 40. There is a first check valve, shown generally at 42, and a second check valve, shown generally at 44, where both check valves 42,44 are in fluid communication with the cavity 38.

The three-port turbo purge module 18 also includes a first port 46 which is connected to and in fluid communication with the fourth conduit 20d. Integrally formed with the first port 46 is a first cap portion 48, and the first cap portion 48 is connected to the housing 40. The three-port turbo purge module 18 also includes a second port 50 integrally formed with a second cap portion 52, where the second cap portion 52 is also connected to the housing 40. The connection between the first cap portion 48 and the housing 40 forms a first check valve cavity, shown generally at 56a, and formed as part of a first side wall 58a of the housing 40 is a plurality of first check valve apertures, where one of the first check valve apertures 60a is shown in FIG. 2. The plurality of first check valve apertures 60a allow for fluid communication between the first check valve cavity 56a and the cavity 38 when the first check valve 42 is in an open position.

The first check valve 42 also includes a first valve member 62a, located in the first check valve cavity 56a, and includes a first seal member 66a that selectively contacts a first valve seat 68 formed as part of the first side wall 58a. The valve seat 68 at least partially surrounds the aperture 60a, and no air passes around the valve member 62a when the seal member 66a is in contact with the valve seat 68, where the first check valve 42 is in the closed position. Also formed as part of the first cap portion 48 is a first base portion 72a, and the first valve member 62a is in contact with the first base portion 72a when the first check valve 42 is in the open position. Formed as part of the first base portion 72a is a first plurality of vents 74a which are in fluid communication with the cavity 56a, such that when the seal member 66a is not in contact with the valve seat 68, air and/or purge vapor is able to flow from the cavity 38 through the apertures 60a into the cavity 56a, and through the vents 74 and into the first port 46.

The second check valve 44 includes similar components to the first check valve 42, and functions in a similar manner. The components of the second check valve 44 include the second cap portion 52 connected to the housing 40. A second check valve cavity, shown generally at 56b, is formed by the connection of the cap portion 52 to housing 40. A second side wall 58b is also formed as part of the housing 40, and the second side wall 58b is integrally formed with an end portion of a mixing portion, shown generally at 82, of a venturi device, shown generally at 84.

A second plurality of check valve apertures 60b is formed as part of the end portion of the mixing portion 82 to provide fluid communication between the mixing portion 82 and the second check valve cavity 56b. The second valve member 62b having a second seal member 66b is located in the second check valve cavity 56b and contacts either a valve seat 86 formed as part of the end portion of the mixing portion 82 or the valve member 62b contacts a second base portion 72b formed as part of the second cap portion 52, depending on whether the second check valve 44 is in the open position or closed position. The base portion 72b and the second cap portion 52 are integrally formed as part of the second port 50. Similarly, to the first base portion 72a, there is a second plurality of vents 74b formed as part of the second base portion 72b.

The mixing portion 82 is hollow, and provides selective fluid communication between the cavity 38 and the second check valve cavity 56b, depending on whether the second check valve 44 is in the open or closed position.

In addition to the mixing portion 82, the venturi valve device 84 also includes a jet portion, shown generally at 92, which is integrally formed as part of the first cap portion 48. There is a circular aperture 94 which is formed as part of the first side wall 58a, where the circular aperture 94 includes a wall portion 96 which is integrally formed as part of the first side wall 58a. The jet portion 92 is disposed in the circular aperture 94. The jet portion 92 is generally conical in shape, and provides continuous fluid communication between the cavity 38 and the first check valve cavity 56a.

Referring again generally to FIGS. 1-3, there is also a carbon canister 100 connected to and in fluid communication with the fifth conduit 20e, such that the carbon canister 100 is in fluid communication with the three-port turbo purge module 18. More specifically, the fifth conduit 20e is connected to the inlet port 22, as mentioned above. A sixth conduit 20f provides fluid communication between the three-port turbo purge module 18 and the inlet passage 20a. More specifically, the sixth conduit 20f is connected to and in fluid communication with the second port 50.

The fourth conduit 20d is connected to the first port 46, such that when the turbocharger unit 12 is active, some of the pressurized air generated by the turbocharger unit 12 is able to flow from the third conduit 20c, through the fourth conduit 20d, and into the three-port turbo purge module 18.

The vapor purge system 10 has multiple modes of operation. In a first mode of operation, when the turbocharger unit 12 is not active, air flows through the inlet passage 20a, the turbocharger unit 12, the throttle assembly 14, and into the intake manifold 16. There is vacuum pressure in the intake manifold 16 created by the engine during the first mode of operation, drawing air into the intake manifold 16. This vacuum pressure is also in the fourth conduit 20d, and when the valve member 30 of the three-port turbo purge module 18 is in an open position, the vacuum pressure causes the first check valve 42 to open, where during the first mode of operation, the vacuum pressure draws the purge vapor from canister 100, through the fifth conduit 20e, the three-port turbo purge module 18, and into the fourth conduit 20d. More specifically, during the first mode of operation, the vacuum pressure draws the valve member 62a away from the valve seat 68 and toward the first base portion 72a, such that the valve member 62a contacts the first base portion 72a, allowing purge vapor to pass from canister 100, through the fifth conduit 20e, through the cavity 28 of the overmold assembly housing 24 and into the cavity 38, through the first check valve apertures 60a, the first check valve cavity 56a, through the vents 74a, the first port 46 and into the fourth conduit 20d. The purge vapor then flows through the fourth conduit 20d, through the third conduit 20c where the purge vapor mixes with air and flows into the intake manifold 16. This same vacuum pressure also causes the second check valve 44 to close, such that no fresh air is able to pass through the mixing portion 82 into the second check valve cavity 56b. More specifically, the valve member 64b moves away from the second base portion 72b and towards the valve seat 86, such that the seal member 66b is placed in contact with the valve seat 86, placing the second check valve 44 in the closed position. Also, any purge vapor that does not pass through the first check valve 42 flows from the cavity 38 through the jet portion 92 and into the first check valve cavity 56a, and into the first port 46, mixing with the air and purge vapor that has flowed through the first check valve 42 and into the first port 46.

The vapor purge system 10 also has a second mode of operation, where the turbocharger unit 12 is activated, and air flowing into the turbocharger unit 12 from the inlet passage 20a becomes pressurized, the pressurized air then flows through the throttle assembly 14, and the pressurized air then flows into the intake manifold 16. In this second mode of operation, the manifold 16 is operating under positive pressure. During the second mode of operation, the fourth conduit 20d is also operating under positive pressure, which results in pressurized air flowing into the first port 46. During the second mode of operation, the pressurized air then flows through the vents 74a and into the first check valve cavity 56a and applies pressure to the first valve member 62a, moving the valve member 62a towards the valve seat 68 such that the seal member 66a contacts the valve seat 68, placing the first check valve 42 in the closed position. Because the first check valve 42 is in the closed position, the pressurized air flowing into the first check valve cavity 56a is forced to flow into the jet portion 92 of the venturi device 84, which restricts airflow and therefore increases the velocity of the air flowing through the jet portion 92, such that the air remaining in the first check valve cavity 56a remains pressurized. During the second mode of operation, the restriction of the flow of air through the jet 92 maintains a high pressure in check valve cavity 56a. The first check valve 42 is exposed to this high pressure, which also keeps the first check valve 42 in the closed position. The pressurized air is accelerated through the jet portion 92, and the jet portion 92 directs the high-velocity air into the mixing portion 82 of the venturi device 84. The air flowing through the mixing portion 82 applies pressure to the valve member 62b, moving the valve member 62b away from the valve seat 86, such that the seal member 66b is no longer in contact with the valve seat 86. The valve member 62b moves towards the second base portion 72b such that the valve member 62b is in contact with the base portion 72b, placing the second check valve 44 in an open position.

The flow of high-velocity air from the jet portion 92 into the mixing portion 82 creates a vacuum in the cavity 38, such that when the valve member 30 is in the open position, purge vapor flowing into the cavity 38 from the cavity 28 of the overmold assembly housing 24 is drawn into the mixing portion 82, such that the purge vapor mixes with the high-velocity air flowing into the mixing portion 82 from the jet portion 92. The speed of the high-velocity air is reduced after flowing through the mixing portion 82. Because the second check valve 44 is in the open position, the mixture of air and purge vapor flows from the mixing portion 82 into the second check valve cavity 56b, through the vents 74b, the second port 50, and into the sixth conduit 20f, where the mixture of air and purge vapor then flows into the inlet passage 20a. The mixture of air and purge vapor air then flows through the turbocharger unit 12, the throttle assembly 14, and into the intake manifold 16.

The three-port turbo purge module 18 also has a hose-off detection function, as mentioned above. The second cap portion 52 includes an aperture 104 having a sidewall 106. Disposed in the aperture 104 is a port 108 of a pressure sensor assembly, shown generally at 110. The port 108 includes a sidewall 108a having a groove 108b, and a seal 112 disposed in the groove 108b, and in contact with the sidewall 106 to prevent air or purge vapor from leaking out of the aperture 104. The port 108 has a cavity 108c which is in fluid communication with the second check valve cavity 56b. The pressure sensor assembly 110 also includes a housing 114, and disposed in the housing 114 are various electronic components, shown generally at 116, which are in electrical communication with a connector 118.

During the first mode of operation, as mentioned above, there is vacuum pressure in the cavity 38 and the mixing portion 82 (which is from the intake manifold 16), which causes the second check valve 44 to close. The vacuum pressure from the intake manifold 16 is also present in the third conduit 20c, and the second conduit 20b. In this embodiment, the vacuum pressure from the intake manifold 16 is between 0 kPa and 90 kPa. A small amount of the vacuum pressure from the intake manifold 16 is also present in the inlet passage 20a, which in this embodiment is about 1 kPa due to losses of the air flow through the throttle assembly 14, and the turbocharger unit 12, which is inactive during the first mode of operation. This small amount of vacuum pressure is also present in the sixth conduit 20f, and the second check valve cavity 56b is also exposed to this small amount of vacuum pressure. Therefore, there is also vacuum pressure in the port 108 of the pressure sensor assembly 110, and this small amount of vacuum pressure is detectable by the components 116. It should be noted that although this small amount of vacuum pressure is present in the second check valve cavity 56b, the second check valve 44 remains closed due to the larger amount of vacuum pressure in the cavity 38 and the mixing portion 82.

During the first mode of operation, if the sixth conduit 20f becomes detached from the second port 50, or the sixth conduit 20f becomes disconnected from the inlet passage 20a, the second check valve cavity 56b is no longer exposed to the vacuum pressure in the inlet passage 20a, and there is therefore no vacuum pressure in the second check valve cavity 56b. Therefore, no vacuum pressure is detected by the pressure sensor assembly 110. No vacuum pressure being detected by the pressure sensor assembly 110 during the first mode of operation is therefore used as an indication that the sixth conduit 20f has become disconnected from either the inlet passage 20a or the second port 50. If the sixth conduit 20f becomes disconnected from either the inlet passage 20a or the second port 50, purge vapor is released from the three-port turbo purge module 18 into the atmosphere during the second mode of operation. Therefore, during the second mode of operation, to prevent purge vapor from being released into the atmosphere, the turbo purge module 18 is deactivated when there is a detection (by the pressure sensor assembly 110) that there is no vacuum pressure present in the second check valve cavity 56b, indicating that the sixth conduit 20f has become disconnected from the second port 50 or the inlet passage 20a. More specifically, the solenoid assembly 26 is deactivated such that the valve member 30 is in contact with a valve seat 32, and therefore in a closed position. The valve member 30 being in contact with the valve seat 32 prevents purge vapor from entering the turbo purge module 18, such that purge vapor is therefore prevented from being released into the atmosphere. Once the hose-off condition has been detected, appropriate actions may be taken to reduce emissions and alert the driver of the vehicle to the malfunction, including, but not limited to, deactivation of the turbo purge module 18 during conditions when the intake manifold 16 is operating under positive pressure.

Figure 4:
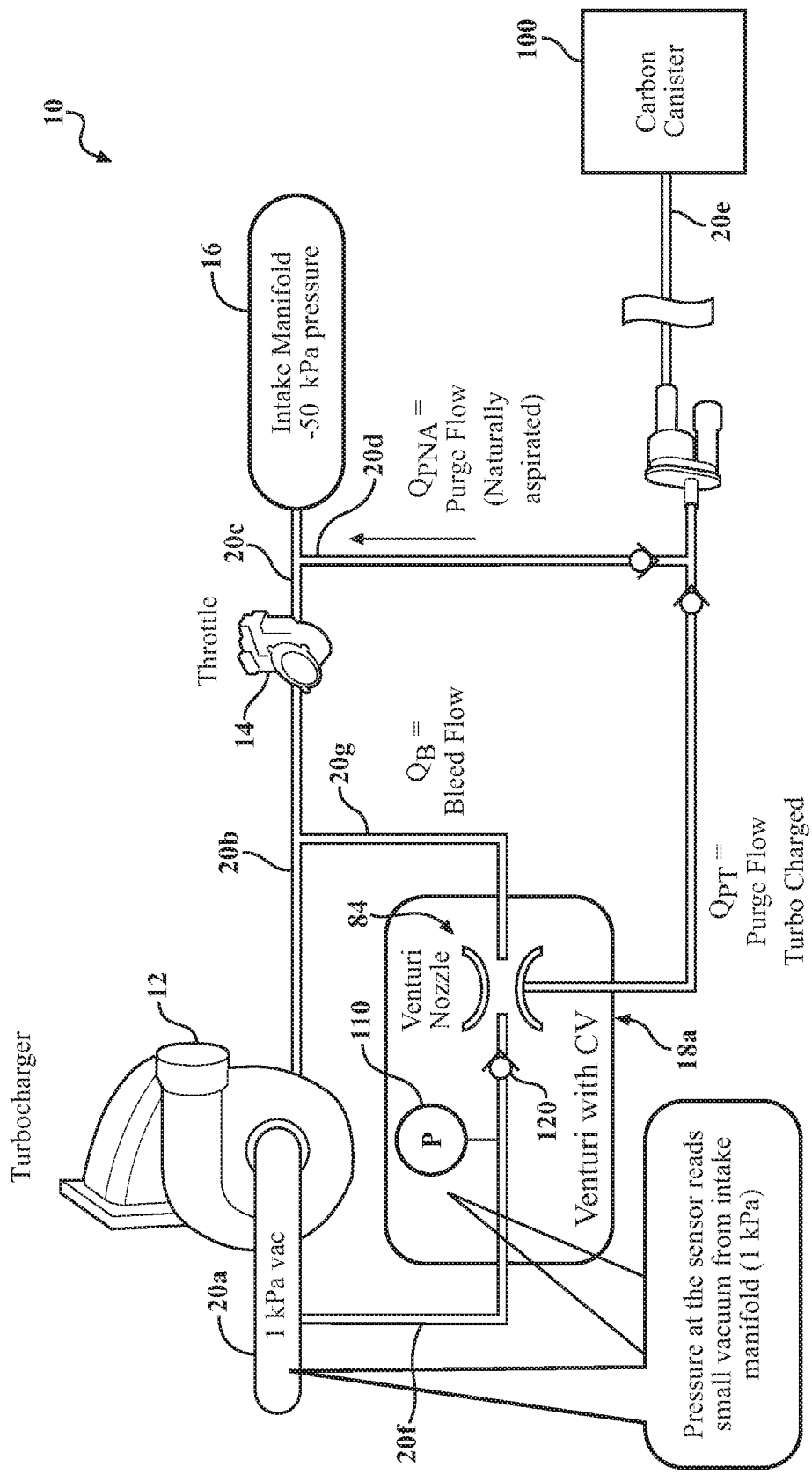
FIG. 4 is a diagram of an alternate embodiment of a vapor purge system having a hose-off detection function, according to embodiments of the present invention.

An alternate embodiment of the present invention is shown in FIG. 4, with like numbers referring to like elements. In this embodiment, there are several discreet components assembled as a module 18A, where the module 18A includes the venturi device 84, and the pressure sensor assembly 110. There is also an additional check valve 120 disposed in the sixth conduit 20f, and there is an additional seventh conduit 20g connected to the second conduit 20b and the venturi device 84. If the sixth conduit 20f becomes detached, or broken, there is no vacuum which is detected by the pressure sensor assembly 110 and the hose-off condition is diagnosed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    a vapor purge system having a hose-off detection function, including:
        a turbocharger unit in fluid communication with an intake manifold of an engine;
        a turbo purge module in fluid communication with the inlet of the turbocharger unit and the intake manifold;
        a housing having a cavity, the housing being part of the turbo purge module;
        a first check valve mounted to the housing;
        a second check valve mounted to the housing;
        a venturi device located in the cavity, the first check valve and the second check valve controlling the flow of air and purge vapor through the venturi device;
        a first check valve cavity formed by part of the housing, the first check valve located in the first check valve cavity, the first check valve operable for biasing the flow of air between the cavity and the first check valve cavity;
        a second check valve cavity formed by part of the housing, the second check valve located in the second check valve cavity, the second check valve operable for providing selective fluid communication between the cavity and the second check valve cavity;
        a pressure sensor assembly directly connected to the housing and in fluid communication with the second check valve cavity of the turbo purge module;
        a first mode of operation, and during the first mode of operation the turbocharger unit is inactive, and the turbocharger unit and the turbo purge module are exposed to vacuum pressure from the intake manifold such that the pressure sensor assembly detects vacuum pressure in the turbo purge module during the first mode of operation, and during the first mode of operation, the first check valve is open and the second check valve is closed such that purge vapor flows through the turbo purge module, around the first check valve and into the intake manifold, and during the second mode of operation, the first check valve is closed and the second check valve is opened, and wherein the pressure sensing assembly detects the vacuum pressure in the second check valve cavity during the first mode of operation when the at least one conduit is connected to and in fluid communication with the inlet of the turbocharger unit or the turbo purge module;

a second mode of operation, wherein during the second mode of operation the turbocharger unit is active, and the intake manifold operates under positive pressure;
wherein the turbo purge module is deactivated during the second mode of operation if vacuum pressure in the turbo purge module is undetectable by the pressure sensor assembly during the first mode of operation.

2. The apparatus of claim 1, further comprising at least one conduit connected to and in fluid communication with the turbo purge module and the inlet of the turbocharger unit, wherein during the first mode of operation vacuum pressure in the turbo purge module is undetected when at least one conduit has become detached from the turbo purge module or the inlet of the turbocharger unit.

3. The apparatus of claim 1, wherein the turbo purge module is deactivated during the second mode of operation if, during the first mode of operation, vacuum pressure in the second check valve cavity is undetectable by the pressure sensing assembly.

4. The apparatus of claim 1, wherein purge vapor is prevented from being released into the atmosphere when the turbo purge module is deactivated during the second mode of operation as a result of vacuum pressure being undetected by the pressure sensing assembly during the first mode of operation.

5. A vapor purge system having a hose-off detection function, comprising:
a turbocharger unit;
an intake manifold in fluid communication with the turbocharger unit;
a turbo purge module in fluid communication with the intake manifold, the turbo purge module further comprising:
a housing having a cavity;
a first check valve mounted to the housing;
a second check valve mounted to the housing;
a venturi device located in the cavity, the first check valve and the second check valve controlling the flow of air and purge vapor through the venturi device;
a first check valve cavity formed by part of the housing, the first check valve located in the first check valve cavity, the first check valve operable for biasing the flow of air between the cavity and the first check valve cavity;
a second check valve cavity formed by part of the housing, the second check valve located in the second check valve cavity, the second check valve operable for providing selective fluid communication between the cavity and the second check valve cavity;
a pressure sensing assembly directly connected to the housing of the turbo purge module such that the pressure sensor assembly is in fluid communication with the second check valve cavity of the housing;
at least one conduit connected to and in fluid communication with the inlet of the turbocharger unit and the turbo purge module;
a first mode of operation, where the turbocharger unit is inactive, and there is vacuum pressure in the intake manifold, and the turbo purge module is exposed to the vacuum pressure such that the first check valve is opened and the second check valve is closed, and purge vapor flows through the turbo purge module, around the first check valve and into the intake manifold, and there is vacuum pressure upstream of the turbocharger unit, in the at least one conduit, and a portion of the turbo purge module, and the vacuum pressure in the at least one conduit is detected by the pressure sensing assembly;
a second mode of operation, where the turbocharger unit is active and generates pressurized air such that the intake manifold is operating under positive pressure, the first check valve is closed and the second check valve is opened;
wherein the turbo purge module is deactivated during the second mode of operation if, during the first mode of operation, vacuum pressure in the cavity of the housing is undetectable by the pressure sensing assembly as a result of the at least one conduit becoming disconnected from the inlet of the turbocharger unit or the turbo purge module.

6. The vapor purge system of claim 5,
wherein the pressure sensing assembly detects the vacuum pressure in the second check valve cavity during the first mode of operation when the at least one conduit is connected to and in fluid communication with the turbocharger unit and the turbo purge module.

7. The vapor purge system of claim 6, wherein the turbo purge module is deactivated during the second mode of operation if, during the first mode of operation, vacuum pressure in the second check valve cavity is undetectable by the pressure sensing assembly.

8. The vapor purge system of claim 5, wherein during the second mode of operation, purge vapor is prevented from being released into the atmosphere when the turbo purge module is deactivated as a result of vacuum pressure in the at least one conduit being undetectable by the pressure sensing assembly during the first mode of operation.

9. A method for detecting at least one conduit becoming disconnected in a vapor purge system, comprising the steps of:
providing a turbocharger unit in fluid communication with an intake manifold of an engine;
providing a turbo purge module in fluid communication with the inlet of the turbocharger unit and the intake manifold;
providing a housing having a cavity, the housing being part of the turbo purge module;
providing a first check valve mounted to the housing;
providing a second check valve mounted to the housing;
providing a first check valve cavity formed by part of the housing, the first check valve located in the first check valve cavity, the first check valve operable for providing selective fluid communication between the cavity and the first check valve cavity;
providing a second check valve cavity formed by part of the housing, the second check valve located in the second check valve cavity, the second check valve operable for providing selective fluid communication between the cavity and the second check valve cavity;
providing a pressure sensor assembly directly connected to the housing and in fluid communication with the second check valve cavity of the turbo purge module;
providing a first mode of operation, such that during the first mode of operation the turbocharger unit is inactive; and
providing a second mode of operation;
exposing the turbocharger unit and the turbo purge module to vacuum pressure from the intake manifold during the first mode of operation such that the pressure sensor assembly detects vacuum pressure in the turbo purge module during the first mode of operation;

activating the turbocharger unit during the second mode of operation such that the intake manifold operates under positive pressure;

preventing the activation of the turbo purge module during the second mode of operation if, during the first mode of operation, vacuum pressure in the turbo purge module is undetectable by the pressure sensor assembly.

10. The method of claim 9, further comprising the steps of providing at least one conduit connected to and in fluid communication with the turbo purge module and the inlet of the turbocharger unit such that during the first mode of operation vacuum pressure in the turbo purge module is undetected when at least one conduit has become detached from the turbo purge module or the turbocharger unit.

11. The method of claim 9, further comprising the steps of:

providing a venturi device located in the cavity;

controlling the flow of air and purge vapor through the venturi device using the first check valve and the second check valve;

opening the first check valve and closing the second check valve during the first mode of operation such that purge vapor flows through the turbo purge module, around the first check valve and into the intake manifold, closing the first check valve and opening the second check valve during the second mode of operation.

12. The method of claim 11, further comprising the steps of:

detecting the vacuum pressure in the second check valve cavity using the pressure sensing assembly during the first mode of operation when the at least one conduit is connected to and in fluid communication with the turbocharger unit or the turbo purge module.

13. The method of claim 12, further comprising the steps of keeping the turbocharger unit inactive during the second mode of operation if the pressure sensing assembly does not detect vacuum pressure in the second check valve cavity during the first mode of operation.

14. The method of claim 9, further comprising the steps of preventing purge vapor from being released into the atmosphere when the turbo purge module is inactive if, during the first mode of operation, vacuum pressure in the at least one conduit is undetectable by the pressure sensing assembly.

* * * * *